(12) United States Patent
Jiang et al.

(10) Patent No.: US 12,446,206 B2
(45) Date of Patent: Oct. 14, 2025

(54) THREE-DIMENSIONAL SEMICONDUCTOR STRUCTURE AND FORMATION METHOD THEREOF

(71) Applicant: CHANGXIN MEMORY TECHNOLOGIES, INC., Hefei (CN)

(72) Inventors: Yi Jiang, Hefei (CN); Deyuan Xiao, Hefei (CN); Youming Liu, Hefei (CN); Xingsong Su, Hefei (CN); Weiping Bai, Hefei (CN); Guangsu Shao, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 695 days.

(21) Appl. No.: 17/878,053

(22) Filed: Aug. 1, 2022

(65) Prior Publication Data

US 2023/0403840 A1  Dec. 14, 2023

(30) Foreign Application Priority Data

Jun. 14, 2022 (CN) .......................... 202210667646.X (51) Int. Cl.
*H01L 23/528* (2006.01)
*H10B 12/00* (2023.01)
(52) U.S. Cl.
CPC ....... *H10B 12/0335* (2023.02); *H10B 12/312* (2023.02)

(58) Field of Classification Search
None
See application file for complete search history.

(56) References Cited

U.S. PATENT DOCUMENTS

2021/0012828 A1* 1/2021 Kim .................... G11C 11/4097

FOREIGN PATENT DOCUMENTS

EP    3826058 A1    5/2021

* cited by examiner

*Primary Examiner* — Steven B Gauthier
*Assistant Examiner* — Lamont B Koo
(74) *Attorney, Agent, or Firm* — Kilpatrick Townsend & Stockton LLP (57) ABSTRACT

Embodiments relate to a three-dimensional semiconductor structure and a formation method thereof. The three-dimensional semiconductor structure includes: a substrate; and a device structure positioned on a top surface of the substrate. The device structure includes memory rows arranged at intervals along a first direction, each of the memory rows includes memory cells arranged at intervals along a second direction and a gap between adjacent two of the memory cells, and each of the memory cells includes a first stacked layer and a word line structure. The word line structure includes a first part positioned in the first stacked layer and a second part extending out of the first stacked layer along the first direction. At least adjacent two of the memory rows exist, and the second part of the memory cell in one of the memory rows extends into the gap in another one of the memory rows.

14 Claims, 11 Drawing Sheets

THREE-DIMENSIONAL SEMICONDUCTOR STRUCTURE AND FORMATION METHOD THEREOF

CROSS-REFERENCE TO RELATED APPLICATION

This application claims priority to Chinese Patent Application No. 202210667646.X, titled "THREE-DIMENSIONAL SEMICONDUCTOR STRUCTURE AND FORMATION METHOD THEREOF" and filed to the State Patent Intellectual Property Office on Jun. 14, 2022, the entire contents of which are incorporated herein by reference.

TECHNICAL FIELD

The present disclosure relates to the field of semiconductor manufacturing technology, and more particularly, to a three-dimensional semiconductor structure and a formation method thereof.

BACKGROUND

As a type of semiconductor apparatus commonly used in electronic devices such as computers, Dynamic Random Access Memory (DRAM) is constituted by a plurality of memory cells, where each of the plurality of memory cells generally includes a transistor and a capacitor. A gate electrode of the transistor is electrically connected to a word line, a source electrode of the transistor is electrically connected to a bit line, and a drain electrode of the transistor is electrically connected to the capacitor, where a word line voltage of the word line can control the transistor to be turned on or off, such that data information stored in the capacitor can be read or written into the capacitor through the bit line.

To increase storage capacity, semiconductor structures such as the DRAM have developed from vertical structures to horizontal structures, but an integration level of the DRAM with the horizontal structures still needs to be improved.

Therefore, how to improve the integration level of the semiconductor structure to expand application fields of the semiconductor structures is a technical problem that needs to be solved urgently at present.

SUMMARY

A semiconductor structure and a method for forming a semiconductor structure provided by some embodiments of the present disclosure are used for solving a problem of lower integration level of the semiconductor structure, to expand application fields of the semiconductor structure.

According to some embodiments, the present disclosure provides a three-dimensional semiconductor structure, including:

a substrate; and
a device structure positioned on a top surface of the substrate. The device structure includes memory rows arranged at intervals along a first direction, each of the memory rows includes memory cells arranged at intervals along a second direction and a gap between adjacent two of the memory cells, and each of the memory cells includes a first stacked layer and a word line structure. The word line structure includes a first part positioned in the first stacked layer and a second part extending out of the first stacked layer along the first direction. At least adjacent two of the memory rows exist, and the second part of the memory cell in one of the memory rows extends into the gap in another one of the memory rows. Both the first direction and the second direction are directions parallel to the top surface of the substrate, and the first direction intersects with the second direction.

According to other embodiments, the present disclosure also provides a method for forming the three-dimensional semiconductor structure according to any one of the above embodiments. The method includes:

providing a substrate; and
forming a device structure on a top surface of the substrate. The device structure includes memory rows arranged at intervals along a first direction, each of the memory rows includes memory cells arranged at intervals along a second direction and a gap between adjacent two of the memory cells, and each of the memory cells includes a first stacked layer and a word line structure. The word line structure includes a first part positioned in the first stacked layer and a second part extending out of the first stacked layer along the first direction. At least adjacent two of the memory rows exist, and the second part of the memory cell in one of the memory rows extends into the gap in another one of the memory rows. Both the first direction and the second direction are directions parallel to the top surface of the substrate, and the first direction intersects with the second direction.

According to the three-dimensional semiconductor structure and a formation method thereof provided by some embodiments of the present disclosure, on a substrate there is provided a device structure including memory rows arranged at intervals in the first direction, where each of the memory rows includes memory cells arranged at intervals along a second direction and a gap between adjacent two of the memory cells, and word line structures in the memory cells in one of the memory rows extend into the gap in another one of the memory rows, such that word line signals can be led out from the gap between the two adjacent memory cells.

DETAILED DESCRIPTION

Embodiments of a three-dimensional semiconductor structure and a formation method thereof provided by the present disclosure will be described in detail below with reference to the accompanying drawings.

Figure 1:
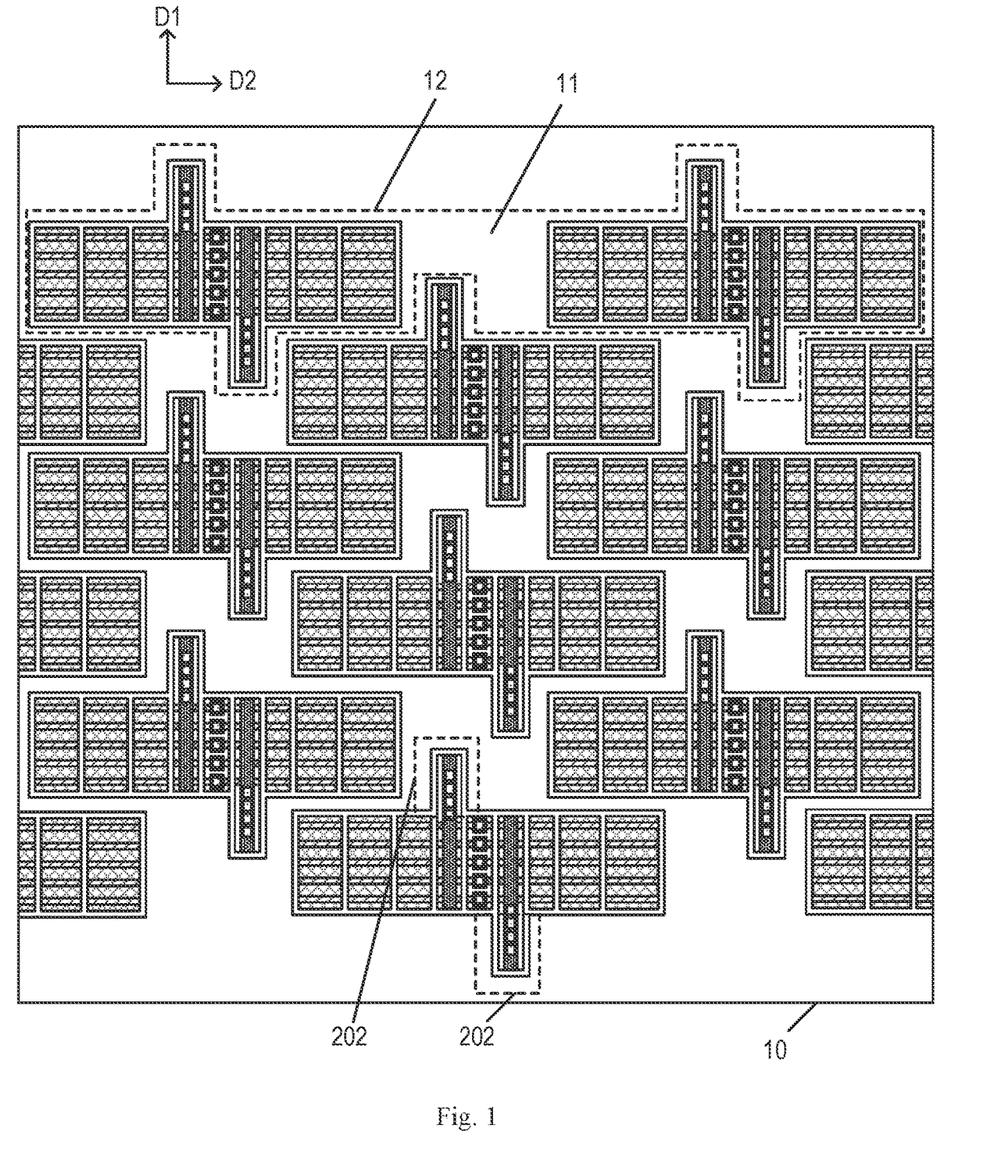
FIG. 1 is a schematic top view of a three-dimensional semiconductor structure according to an embodiment of the present disclosure.
Figure 2:
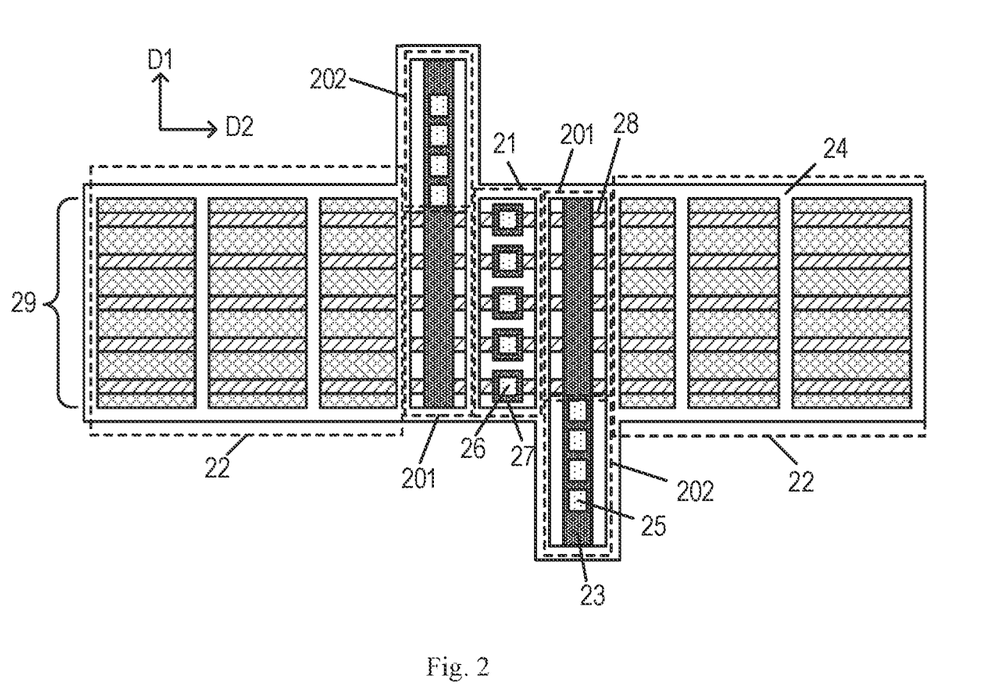
FIG. 2 is a schematic top view of a memory cell according to an embodiment of the present disclosure.
Figure 3:
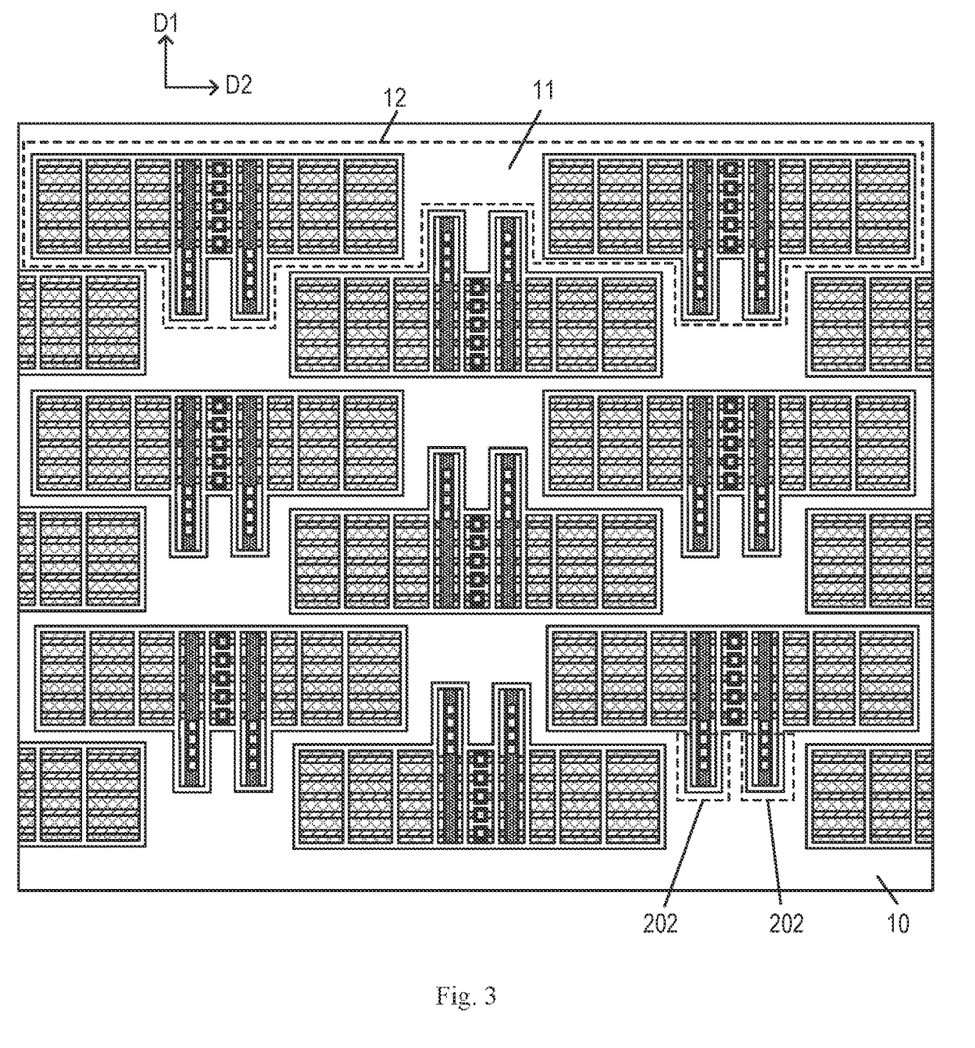
FIG. 3 is a schematic top view of a three-dimensional semiconductor structure according to another embodiment of the present disclosure.
Figure 4:
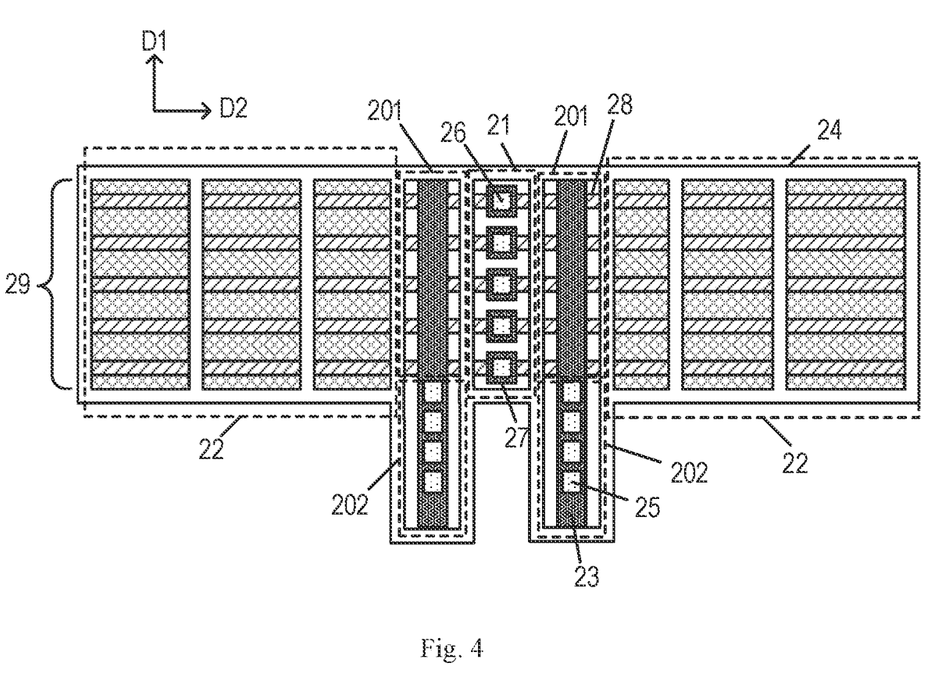
FIG. 4 is a schematic top view of a memory cell according to yet another embodiment of the present disclosure.
Figure 5:
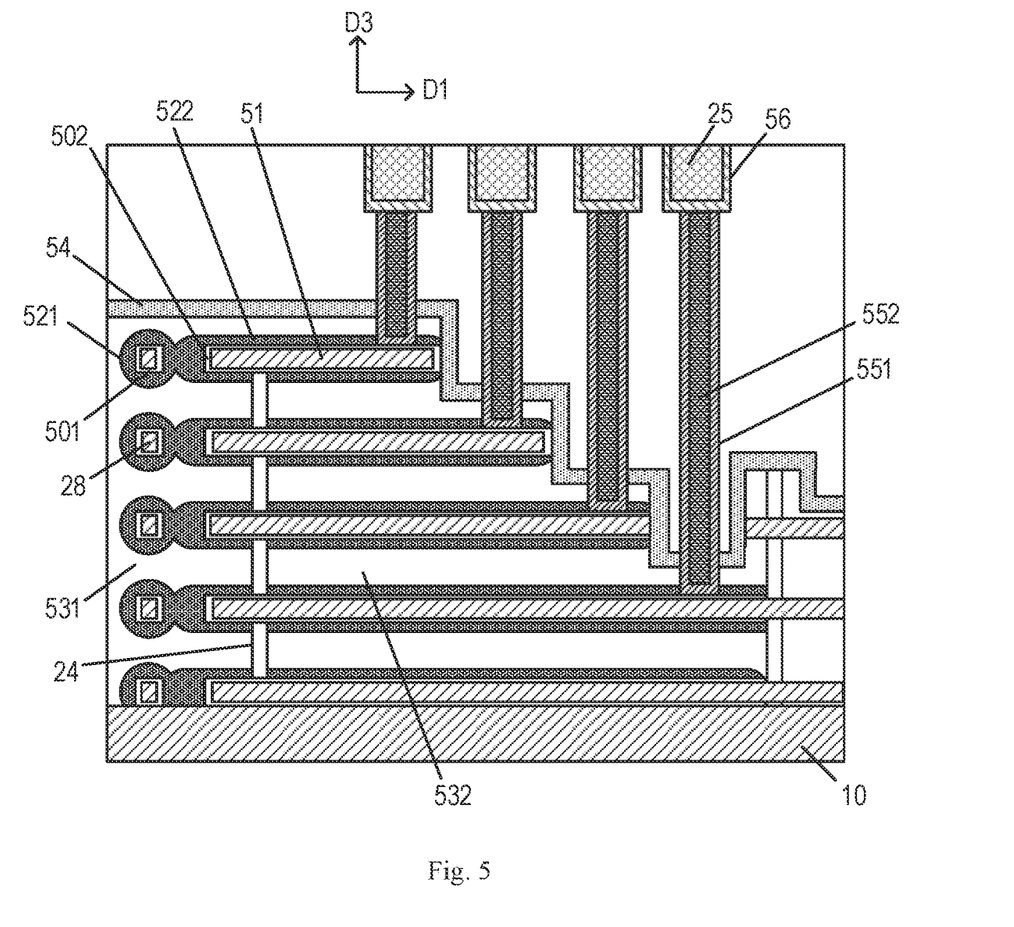
FIG. 5 is a schematic cross-sectional view of a second part of a word line structure according to an embodiment of the present disclosure.

The present disclosure provides a three-dimensional semiconductor structure. FIG. 1 is a schematic top view of the three-dimensional semiconductor structure according to an embodiment of the present disclosure; FIG. 2 is a schematic top view of a memory cell according to an embodiment of the present disclosure; FIG. 3 is a schematic top view of the three-dimensional semiconductor structure according to another embodiment of the present disclosure; FIG. 4 is a schematic top view of the memory cell according to yet another embodiment of the present disclosure; and FIG. 5 is a schematic cross-sectional view of a second part of a word line structure according to an embodiment of the present disclosure. The three-dimensional semiconductor structure described in this embodiment may be, but is not limited to, a Dynamic Random Access Memory (DRAM). As shown in FIGS. 1 to 5, the three-dimensional semiconductor structure includes:
- a substrate 10; and
- a device structure positioned on a top surface of the substrate 10. The device structure includes memory rows 12 arranged at intervals along a first direction D1, each of the memory rows 12 includes memory cells arranged at intervals along a second direction D2 and a gap 11 between adjacent two of the memory cells, and each of the memory cells includes a first stacked layer 29 and a word line structure. The word line structure includes a first part 201 positioned in the first stacked layer 29 and a second part 202 extending out of the first stacked layer 29 along the first direction D1. At least adjacent two of the memory rows 12 exist, and the second part 202 of the memory cell in one of the memory rows 12 extends into the gap 11 in another one of the memory rows 12. Both the first direction D1 and the second direction D2 are directions parallel to the top surface of the substrate 10, and the first direction D1 intersects with the second direction D2.

In some embodiments, the substrate 10 may be, but is not limited to, a silicon substrate, and this embodiment is described by taking an example where the substrate 10 as the silicon substrate. In other examples, the substrate 10 may be a semiconductor substrate such as gallium nitride, gallium arsenide, gallium carbide, silicon carbide, or silicon on insulator (SOI). The substrate 10 is configured to support the device structure thereon. The top surface of the substrate 10 refers to a surface of the substrate 10 facing the device structure. The device structure includes a plurality of the memory rows 12 arranged at intervals along the first direction D1, and each of the memory rows 12 includes a plurality of memory cells arranged at intervals along the second direction D2 intersecting with the first direction D1, such that the plurality of memory cells are regularly arranged on the top surface of the substrate 10 to fully utilize an area of the top surface of the substrate 10, thereby improving the integration level of the three-dimensional semiconductor structure. The intersection mentioned in this embodiment may be a vertical intersection (i.e., orthogonal intersection) or an oblique intersection. In this embodiment, "a plurality of" refers to two or more.

The word line structure includes the first part 201 electrically connected to the memory cells in the first stacked layer 29, and the second part 202 extending out of the first stacked layer 29 and configured to electrically connect external control signals. Both the first part 201 and the second part 202 may extend along the first direction D1, and the first part 201 is electrically connected to the second part 202. In this embodiment, by extending the second part 202 of the memory cell in one of the memory rows 12 into the gap 11 in another one of the memory rows 12, the space of the top surface of the substrate 10 can be more fully utilized, and thus arrangement of the plurality of memory cells in the device structure is more compact to reduce the size of the three-dimensional semiconductor structure, thereby improving the integration level of the three-dimensional semiconductor structure.

In some embodiments, the first stacked layer 29 includes first semiconductor layers arranged at intervals along a third direction D3, and each of the first semiconductor layers includes first semiconductor pillars 28 arranged at intervals along the first direction D1, where the third direction D3 is a direction perpendicular to the top surface of the substrate 10.

The word line structure includes word lines 23 arranged at intervals along the third direction D3, where the word lines 23 extend along the first direction D1. Each of the word lines 23 includes a first sub part 521 continuously wrapping the first semiconductor pillars 28 arranged at intervals along the first direction D1 and a second sub part 522 extending out of the first semiconductor layer along the first direction D1 and electrically connected to the first sub part 521. In any adjacent two of the word lines along the third direction D3, the second sub part 522 of one of the two word lines 23 closer to the substrate 10 protrudes from the second sub part 522 of other one of the two word lines 23 along the first direction D1.

To support the second part 202 of the word line structure to improve structural stability of the memory cell, in some embodiments, the first semiconductor layer extends along the second direction D2. The device structure also includes:
- a second stacked layer including second semiconductor layers 51 arranged at intervals along the third direction D3, where the second semiconductor layers 51 extend along the first direction D1. In adjacent two of the second semiconductor layers 51 along the third direction D3, one of the two second semiconductor layers 51 closer to the substrate 10 protrudes from other one of the two second semiconductor layers 51 along the first direction D1, and a plurality of the second sub parts 51 respectively wrap a plurality of the second semiconductor layers 522.

In some embodiments, the memory cell includes the first stacked layer 29 and the second stacked layer arranged along the first direction D1. The word line structure includes a plurality of the word lines 23 arranged at intervals along the third direction D3, the plurality of word lines 23 extend along the first direction D1, and each of the plurality of word lines 23 includes the first sub part 521 positioned in the first stacked layer 29 and the second sub part 522 positioned in the second stacked layer. A plurality of the first sub parts 521 arranged at intervals along the third direction D3 constitute the first part 201 of the word line structure, and a plurality of the second sub parts 522 arranged at intervals along the third direction D3 constitute the second part 202 of the word line structure. The first sub part 521 of the word line 23 continuously wraps the first semiconductor pillars 28 arranged at intervals along the first direction D1, and the second sub part 522 of the word line 23 wraps the second semiconductor layer 51. The first sub part 521 and the second sub part 522 in the same word line 23 may be formed synchronously, such that there is no contact interface between the first sub part 521 and the second sub part 522 in the same word line 23. In this way, fabrication processes of the three-dimensional semiconductor structure are simplified, and an internal resistance of the word line structure is reduced. In an embodiment, a first spacer 531 is further arranged between adjacent first sub parts 521 along the third direction D3 for electrically isolating the adjacent first sub parts 521; a second spacer 532 is further arranged between the adjacent second sub parts 522 along the third direction D3 for electrically isolating the adjacent second sub parts 522. The materials of the first spacer 531 and the second spacer 532 may be the same, for example, they are both oxide materials (such as silicon dioxide).

For the two second semiconductor layers 51 adjacent to each other along the third direction D3 in the second semiconductor layer, one of the two second semiconductor layers 51 closer to the substrate 10 protrudes from the other one of the two second semiconductor layers 51 along the first direction D1, such that an end of the second stacked layer away from the first stacked layer 29 forms a step-shaped structure. Therefore, ends of the second sub parts 522 of the plurality of word lines 23 respectively wrapping the plurality of second semiconductor layers 51 also form a step-shaped structure, which facilitates a signal from each of the word lines 23 to be led out from the end of the second sub part 522. It not only contributes to further improving the fabrication processes of the three-dimensional semiconductor structure, but also simplifying word line lead-out processes of the three-dimensional semiconductor structure, thereby reducing fabrication costs of the three-dimensional semiconductor structure.

In an embodiment, the memory cell further includes a first dielectric layer 501 between the first sub part 521 of the word line 23 and the first semiconductor pillar 28, and a second dielectric layer 502 between the second sub part 522 of the word line 23 and the second semiconductor layer 51. The first dielectric layer 501 may be used as a gate dielectric layer in the memory cell. In an embodiment, both a material of the first dielectric layer 501 and a material of the second dielectric layer 502 may be oxide material (such as silicon dioxide).

In an embodiment, the memory cell further includes a third spacer 54, where the third spacer 54 at least wraps a step-shaped end of the side of the second stacked layer away from the first stacked layer 29, to further prevent occurrence of a short circuit between adjacent two of the second sub parts 522.

In some embodiments, both the material of the first semiconductor layer and the material of the second semiconductor layer 51 are silicon materials including doped ions, such that the first semiconductor layer and the second semiconductor layer 51 may be simultaneously formed, which contributes to simplifying the fabrication processes of the three-dimensional semiconductor structure. The first semiconductor layer and the second semiconductor layer 51 are formed by the silicon material with the doped ions, which can enhance conductivity of the first semiconductor layer and the second semiconductor layer 51, thereby reducing the internal contact resistance of the memory cell.

In some embodiments, one of the memory cells further includes:
   a plug structure comprising word line plugs arranged at intervals along the first direction D1, where each of the word line plugs extends along the third direction D3 and is electrically connected to the second sub part 522 of the word line 23.

In some embodiments, the word line plug is electrically connected to the end of the second sub part 522 away from the first sub part 521. That is, a plurality of the word line plugs are electrically connected to a plurality of step top surfaces of the second part 202 with a step-shaped structure. The word line plug includes a first conductive pillar 552, and a first plug 25 positioned on a top surface of the first conductive pillar 552. In an embodiment, the word line plug may further include a first diffusion barrier layer 551 wrapping the first conductive pillar 552 and electrically connected to the second sub part 522, and a first conductive layer 56 wrapping the first plug 25 and electrically connected to the first conductive pillar 552 and the first diffusion barrier layer 551, to reduce electric leakage between adjacent two of the word line plugs and an internal resistance of the word line plug. The external control signal (such as a read signal or write signal) is transmitted to the first sub part 521 in the first stacked layer 29 through the word line plug and the second sub part 522.

In some embodiments, one of the memory cells further includes:
   a bit line structure 21 comprising bit lines 27 arranged at intervals along the first direction D1, where the bit lines 27 extend along the third direction D3.

The first semiconductor pillar 28 includes two first semiconductor sub pillar distributed on opposite two sides of the bit line 27 along the second direction D2 and electrically connected to the bit line 27, and the first sub part 521 of the word line 23 continuously wraps the two first semiconductor sub pillar arranged at intervals along the first direction D1.

In some embodiments, the semiconductor sub pillar includes a channel region, and a source region and a drain region distributed on opposite two sides of the channel region along the second direction D2, and the bit line 27 is adjacent to and is electrically connected to the source region. The memory cell further includes:
   a capacitor structure 22 positioned on the substrate 10, where the capacitor structure 22 is adjacent to and is electrically connected to the drain region; and
   a support structure 24 positioned on the substrate 10, where the support structure 24 includes a first sub support structure and a second sub support structure connected to each other, the first sub support structure is positioned in the first stacked layer 29, and the second sub support structure is distributed around a periphery of the first stacked layer 29 and a periphery of the second part 202.

In some embodiments, as shown in FIG. 2 and FIG. 4, the first stacked layer 29 includes a bit line structure 21, transistor structures distributed on opposite two sides of the bit line structure 21 along the second direction D2, and the capacitor structure positioned on the side of the transistor structure away from the bit line structure 21 along the second direction D2. The transistor structure includes a plurality of transistors arranged at intervals along the first direction D1. The first semiconductor sub pillar includes an active pillar in the transistor structure and a conductive pillar in the capacitor structure. The active pillar includes the channel region, and the source region and the drain region distributed on opposite two sides of the channel region along the second direction D2. The first sub part 521 of the word line 23 continuously wraps a plurality of the channel regions arranged at intervals along the first direction D1.

The bit line 27 extends along the third direction D3, and the top surface of the bit line 27 is electrically connected to the bit line plug 26 to lead out the bit line 27 through the bit line plug 26. In this embodiment, two transistors arranged along the second direction D2 share one bit line 27, such that the size of the memory cell can be further reduced, and thus the integration level of the device structure can be improved. The support structure 24 is arranged around the periphery of the first stacked layer 29 and the periphery of the second stacked layer, and extends into the first stacked layer 29 and the second stacked layer. In one aspect, the support structure 24 is configured to support the memory cells; and in another aspect, the support structure 24 is configured to isolate adjacent two of the memory cells, thereby avoiding signal crosstalk between the adjacent memory cells.

In some embodiments, a length of the second part 202 along the first direction D1 is smaller than that of the first stacked layer 29 along the first direction D1, to reduce the size of the memory cell and to reduce an internal parasitic capacitance effect of the device structure.

In some embodiments, a plurality of the memory rows 12 arranged at intervals along the first direction D1 are sequentially ordered, where a plurality of the memory rows 12 at a first odd-numbered position are aligned and arranged along the first direction D1, and a plurality of the memory rows 12 at a first even-numbered position are aligned and arranged along the first direction D1, such that a plurality of the memory cells are regularly arranged, to improve the integration level of the three-dimensional semiconductor structure, and to further simplify the fabrication processes of the three-dimensional semiconductor structure.

In some embodiments, the memory cell further comprises a bit line structure 21, two of the word line structures are distributed on opposite two sides of the bit line structure 21 along the second direction D2, and the second parts 202 of the two word line structures are positioned on opposite two sides of the first stacked layer 29.

In some embodiments, two of the second parts 202 of the memory cells positioned in a given one of the plurality of memory rows 12 at the first even-numbered position respectively extend into the gaps 11 in two of the plurality of memory rows 12 at the first odd-numbered position adjacent to the given memory row 12 at the first even-numbered position, and two of the second parts 202 of the memory cells positioned in a given one of the plurality of memory rows 12 at the first odd-numbered position respectively extend into the gaps 11 in two of the plurality of memory rows 12 at the first even-numbered position adjacent to the given memory row 12 at the first odd-numbered position.

In some embodiments, in the plane jointly constituted by the first direction D1 and the third direction D3, the projections of the two second parts 202 extending into the same gap 11 are partially overlapped, to reduce the distance between adjacent memory rows 12 at the first odd-numbered positions, and to reduce the distance between adjacent memory rows 12 at the first even-numbered positions, thereby further reducing the size of the device structure and improving the integration level of the three-dimensional semiconductor structure.

In some embodiments, as shown in FIG. 2, extension directions of the second parts 202 of the two word line structures in the memory cell are opposite. For example, the second part 202 of one of the word line structures extends out of the first stacked layer 29 along a positive direction of the first direction D1, and the second part 202 of the other word line structure extends out of the first stacked layer 29 along a negative direction of the first direction D1. The two second parts 202 of the memory cell extend along the first direction D1 into the two gaps 11 arranged at intervals along the first direction D1, as shown in FIG. 1. By means of this structure, the distance between the two second parts 202 in the memory cell can be increased, thereby reducing the parasitic effect of capacitance between the word line plugs electrically connected to the two second parts 202 respectively, further reducing the internal electric leakage of the memory cell and improving the electrical performance of the three-dimensional semiconductor structure.

In some embodiments, the memory cell further includes a bit line structure 21, two of the word line structures are distributed on opposite two sides of the bit line structure 21 along the second direction D2, and the second parts 202 of the two word line structures are positioned on opposite two sides of the first stacked layer 29.

In some embodiments, an extension direction of the second part in a given one of the plurality of memory rows 12 at the first odd-numbered position is opposite to that of the second part 202 in a given one of the plurality of memory rows 12 at the first even-numbered position.

In some embodiments, as shown in FIG. 4, the extension directions of the second parts 202 of the two word line structures in the memory cell are the same. For example, the second parts 202 of the two word line structures both extend out of the first stacked layer 29 along the positive direction of the first direction D1; or the second parts 202 of the two word line structures both extend out of the first stacked layer 29 along the negative direction of the first direction D1. For example, as shown in FIG. 3, the second parts 202 in the memory rows 12 at the first odd-numbered positions all extend along the negative direction of the first direction D1, and the second parts 202 in the memory rows 12 at the first even-numbered positions all extend along the positive direction of the first direction D1. In this way, the area of the top surface of the substrate 10 is fully utilized, such that the integration level of the three-dimensional semiconductor structure is further improved.

Figure 6:
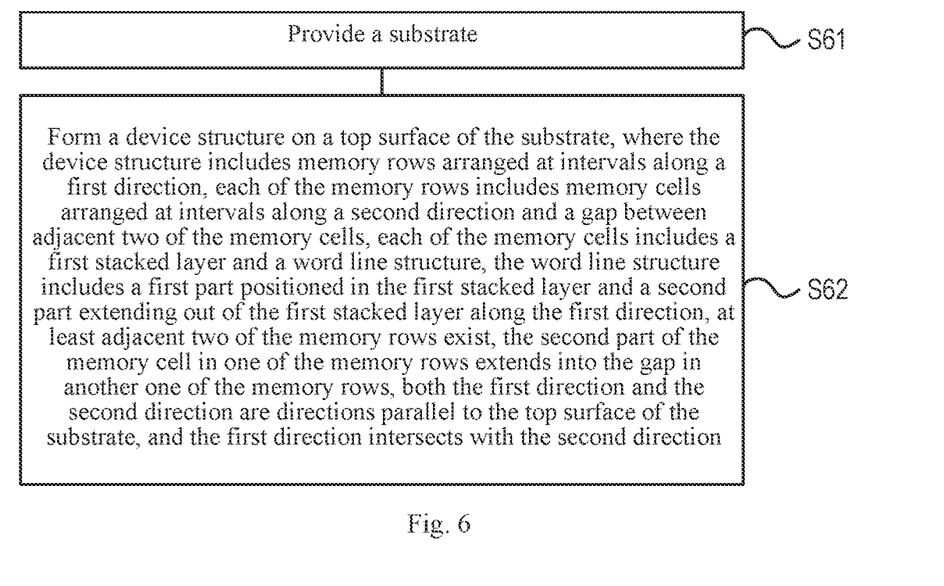
FIG. 6 is a flowchart of a method for forming a three-dimensional semiconductor structure according to an embodiment of the present disclosure.
Figure 7A:
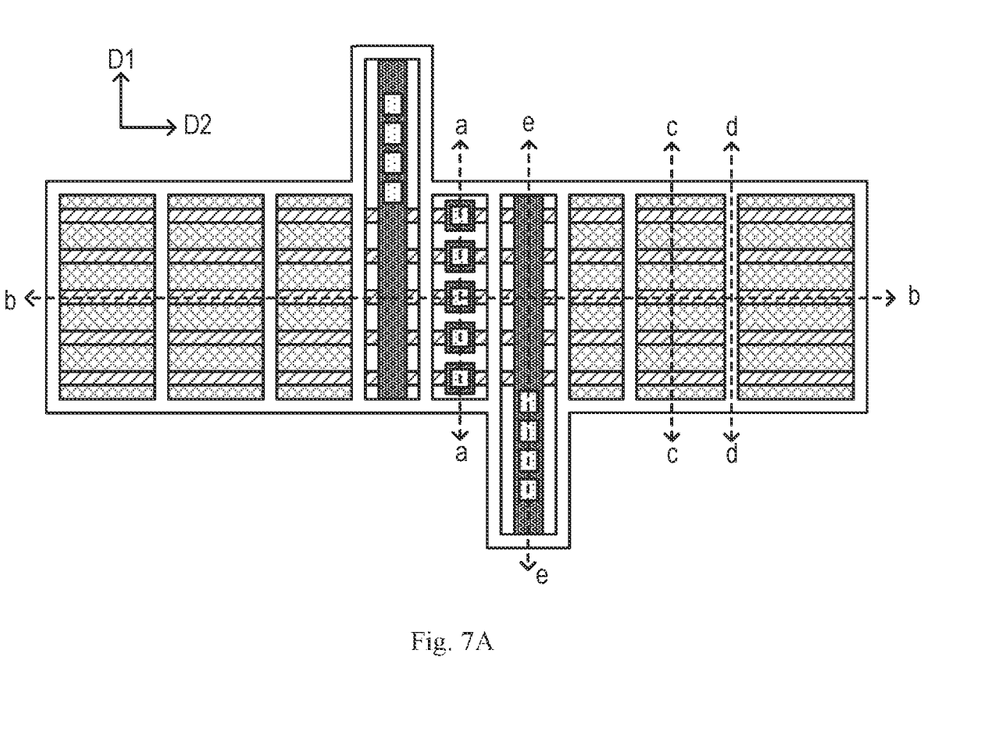
FIGS. 7A-7F are schematic structural diagrams of main processes in a process of forming the three-dimensional semiconductor structure according to embodiments of the present disclosure.

This embodiment further provides a method for forming a three-dimensional semiconductor structure as described in any one of the embodiments. FIG. 6 is a flowchart of the method for forming a three-dimensional semiconductor structure according to an embodiment of the present disclosure; and FIGS. 7A-7F are schematic structural diagrams of main processes in the process of forming the three-dimensional semiconductor structure according to embodiments of the present disclosure. The schematic diagrams of the three-dimensional semiconductor structure formed in this embodiment may be seen in FIGS. 1 to 5. FIG. 7A is a schematic top view of a memory cell in the three-dimensional semiconductor structure formed in this embodiment, and FIGS. 7B-7F are partial cross-sectional views from any one or more positions of a first position a-a, a second position b-b, a third position c-c, a fourth position d-d and a fifth position e-e in FIG. 7A in the process of forming the memory cell, to clearly show the processes for forming the memory cell. As shown in FIGS. 1 to 6 and FIGS. 7A to 7F, the method for forming a three-dimensional semiconductor structure includes the following steps:

Step S61, providing substrate 10; and

Step S62, forming a device structure on a top surface of the substrate 10. The device structure includes memory rows 12 arranged at intervals along a first direction 12, each of the memory rows 12 includes memory cells arranged at intervals along a second direction D2 and a gap 11 between adjacent two of the memory cells, and each of the memory cells includes a first stacked layer 29 and a word line structure. The word line structure includes a first part 201 positioned in the first stacked layer 29 and a second part 202 extending out of the first stacked layer 29 along the first direction D1. At least adjacent two of the memory rows 12 exist, and the second part 202 of the memory cell in one of the memory rows 12 extends into the gap 11 in another one of the memory rows 12. Both the first direction D1 and the second direction D2 are directions parallel to the top surface of the substrate 10, and the first direction D1 intersects with the second direction D2.

Figure 7B:
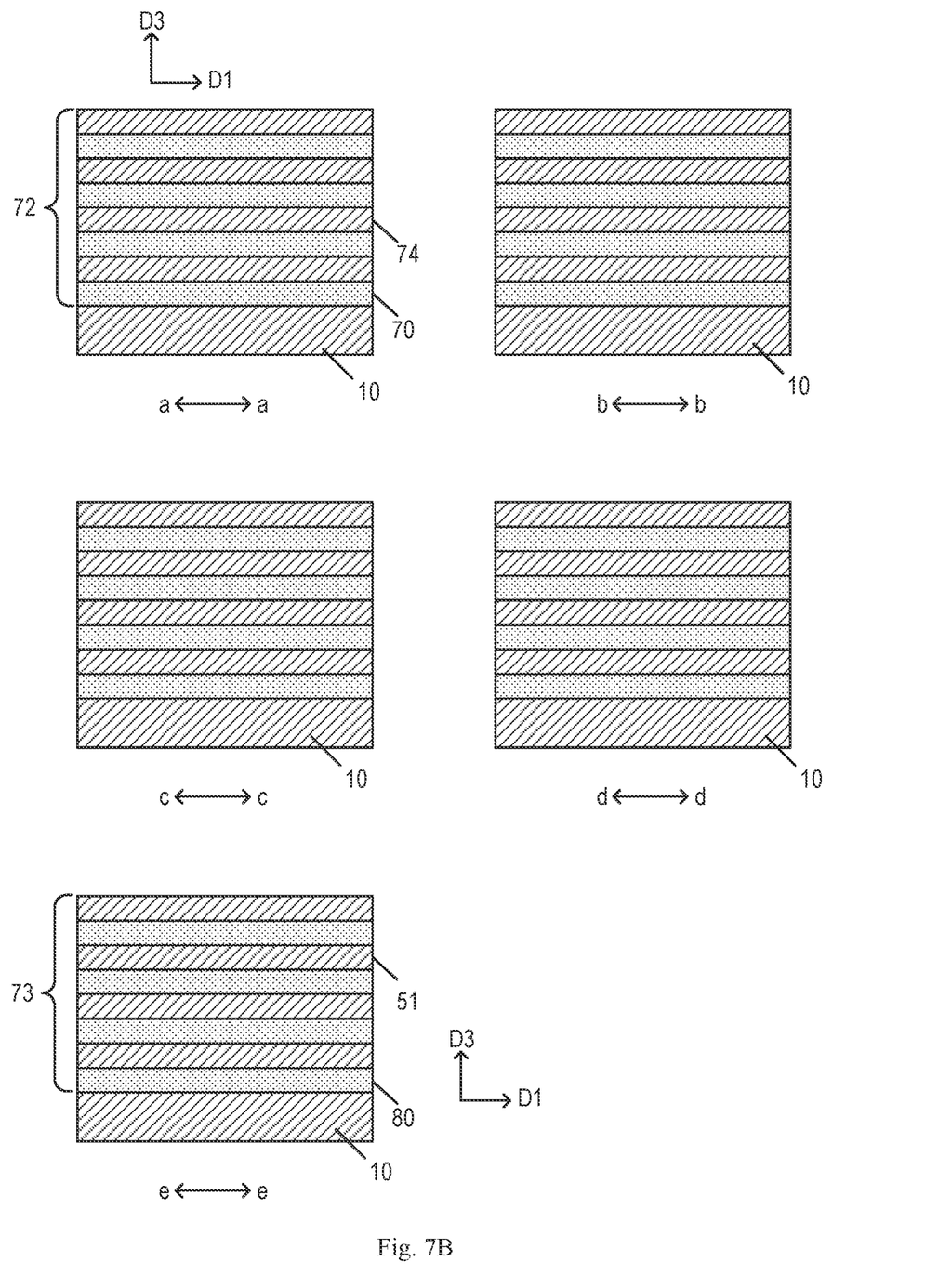

For example, the first stacked layer 29 and the second stacked layer 73, both of which have a superlattice stacked structure, are simultaneously formed on the top surface of the substrate 10, as shown in FIG. 7B. A bit line region, transistor regions positioned on opposite two sides of the bit line region along the second direction D2, and a capacitor region positioned on the side of the transistor region away from the bit line region along the second direction D2 are defined in the first stacked layer 29. The transistor region of the first stacked layer 29 and the second stacked layer 73 are arranged along the first direction D1 and are in contact with each other. The first stacked layer 29 includes a first semiconductor layer 74 and a first sacrificial layer 70 alternately stacked along the third direction D3, and the second stacked layer 73 includes a second semiconductor layer 51 and a second sacrificial layer 80 alternately stacked along the third direction D3. The third direction D3 is a direction perpendicular to the top surface of the substrate 10. The first semiconductor layer 74 and the second semiconductor layer 51 are formed synchronously and are made of silicon materials including doped ions, where the doped ions may be, but are not limited to, N-type ions, to enhance conductivity between the first semiconductor layer 74 and the second semiconductor layer 51.

Figure 7C:
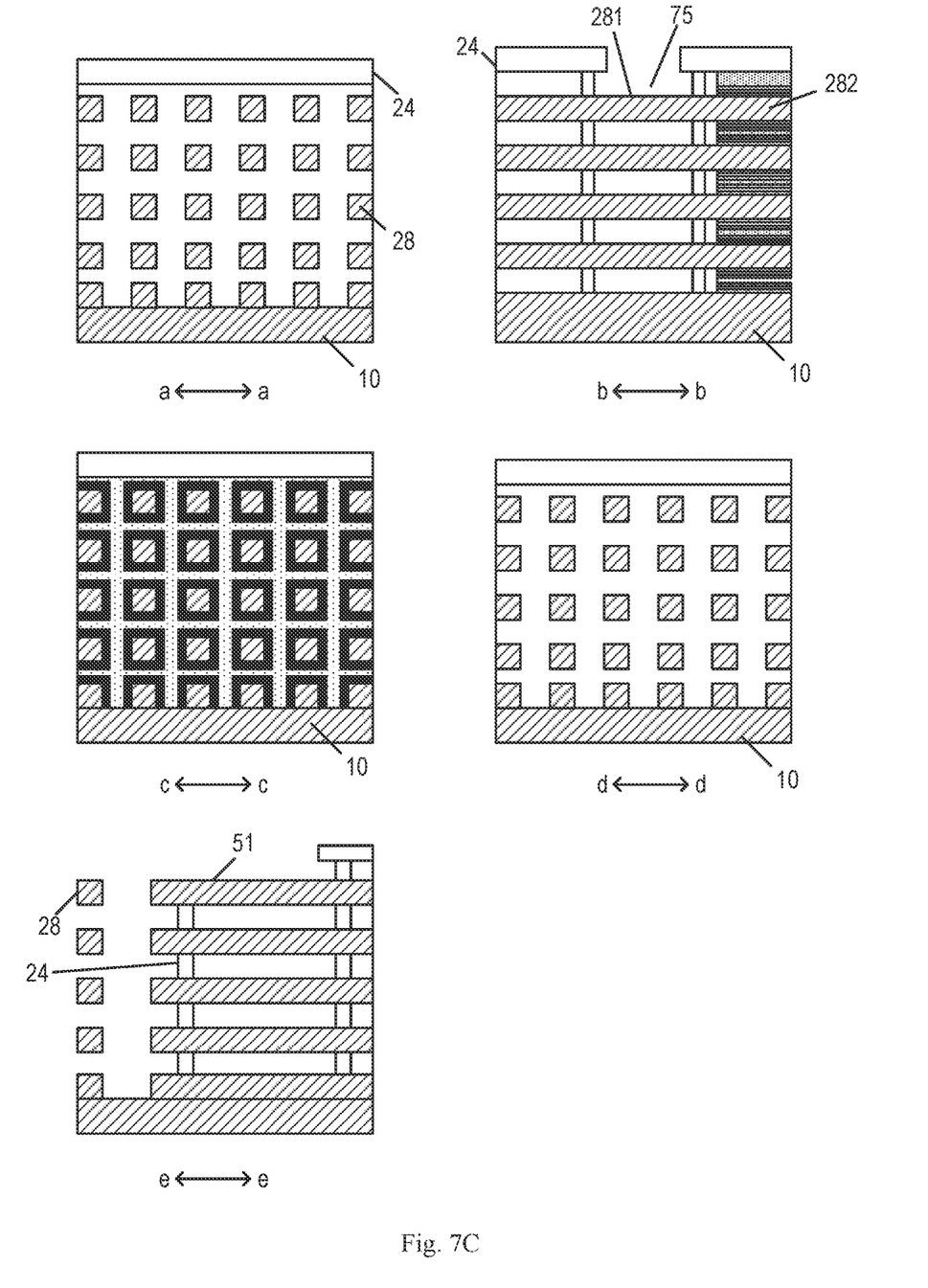

Next, the first stacked layer 29 and the second stacked layer 73 are patterned, a first trench is formed in the first stacked layer 29, and a second trench configured to disconnect the first stacked layer 29 from the second stacked layer 73 is formed simultaneously. The first semiconductor layer 74 in the first stacked layer 29 is separated, by the first trench, into a plurality of first semiconductor pillars 28 arranged at intervals along the first direction. The first semiconductor pillar 28 includes an active pillar positioned in the transistor region and a conductive pillar positioned in the capacitor region. The active pillar includes a channel region, and a source region and a drain region distributed on opposite two sides of the channel region along the second direction D2. Next, the first sacrificial layer 70 and the second sacrificial layer 80 are removed, and the support structure 24 embedded in the first stacked layer 29 and the second stacked layer 73 is formed. Next, a capacitor structure is formed in the capacitor region of the first stacked layer 29, and an opening 75 exposing the channel region 281 is formed in the transistor region, as shown in FIG. 7C. The capacitor structure includes capacitors arranged at intervals along the third direction D3, and the capacitor includes the conductive pillar, a conductive layer wrapping the surface of the conductive pillar, a dielectric layer wrapping the surface of the conductive layer, and an upper electrode layer wrapping the surface of the dielectric layer, where the conductive pillar and the conductive layer together serve as a lower electrode layer of the capacitor.

Figure 7D:
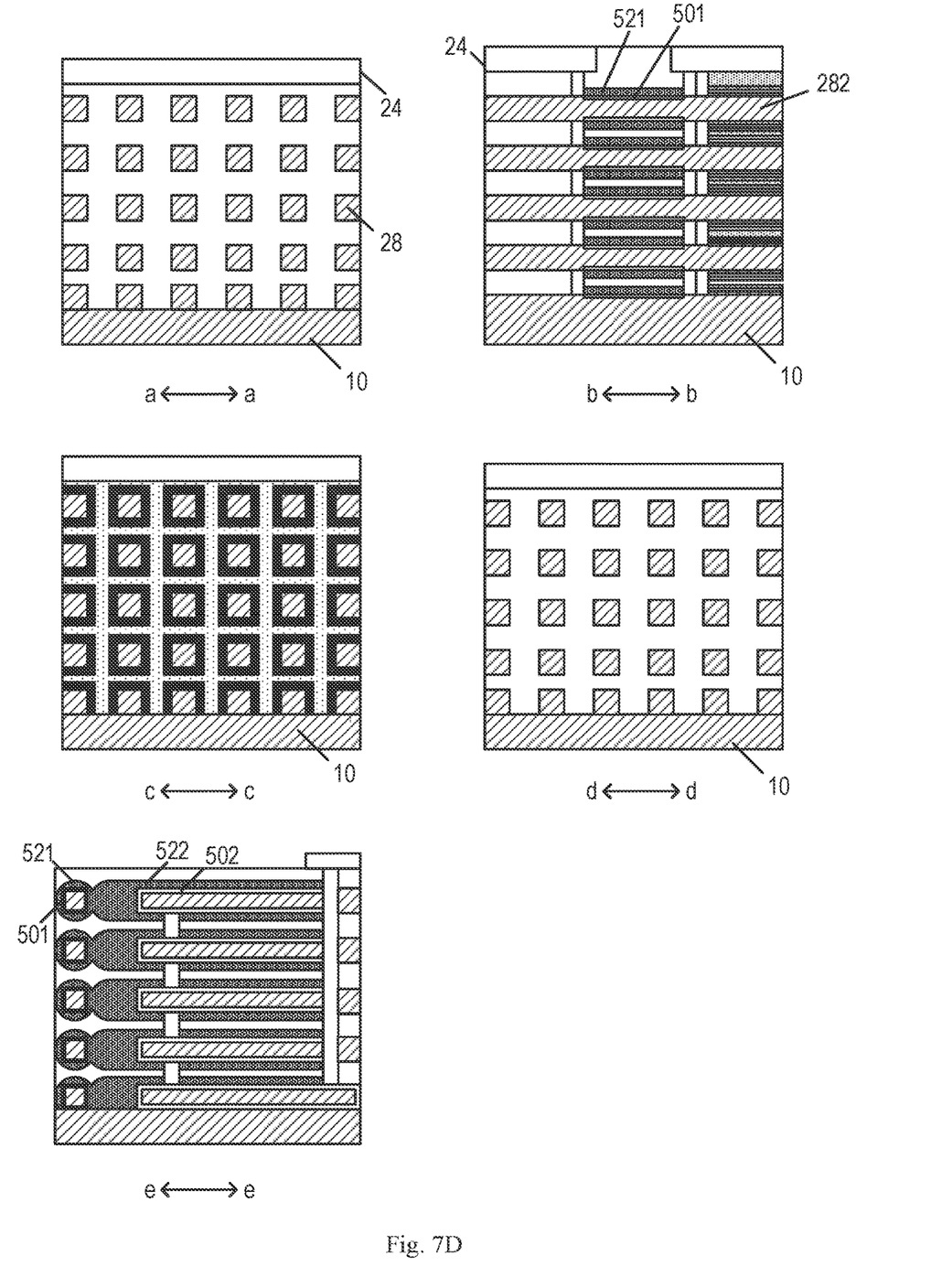

After the first dielectric layer 501 is formed on the surface of the channel region 281 and the second dielectric layer 502 is formed on the surface of the second semiconductor layer 51, word line materials are deposited on the surface of the first dielectric layer 501 and on the surface of the second dielectric layer 502 to form a word line extending along the first direction D1. The word line includes a first sub part 521 positioned on the surface of the first dielectric layer 501 and wrapping the channel region 281 and a second sub part 522 positioned on the surface of the second dielectric layer 502 and wrapping the second semiconductor layer 51, where the first sub part 521 is electrically connected to the second sub part 522, as shown in FIG. 7D. To facilitate the formation of the word line extending along the first direction D1, a thickness of the first sacrificial layer 70 along the third direction D3 is greater than a gap width between adjacent two of the channel regions along the first direction D1. In an embodiment, the thickness of the first sacrificial layer 70 along the third direction D3 is four times greater than the gap width between adjacent two of the channel regions along the first direction D1. The thickness of the second sacrificial layer 80 may be equal to that of the first sacrificial layer 70, and the thickness of the second semiconductor layer 51 may be equal to that of the first semiconductor layer 74.

Figure 7E:
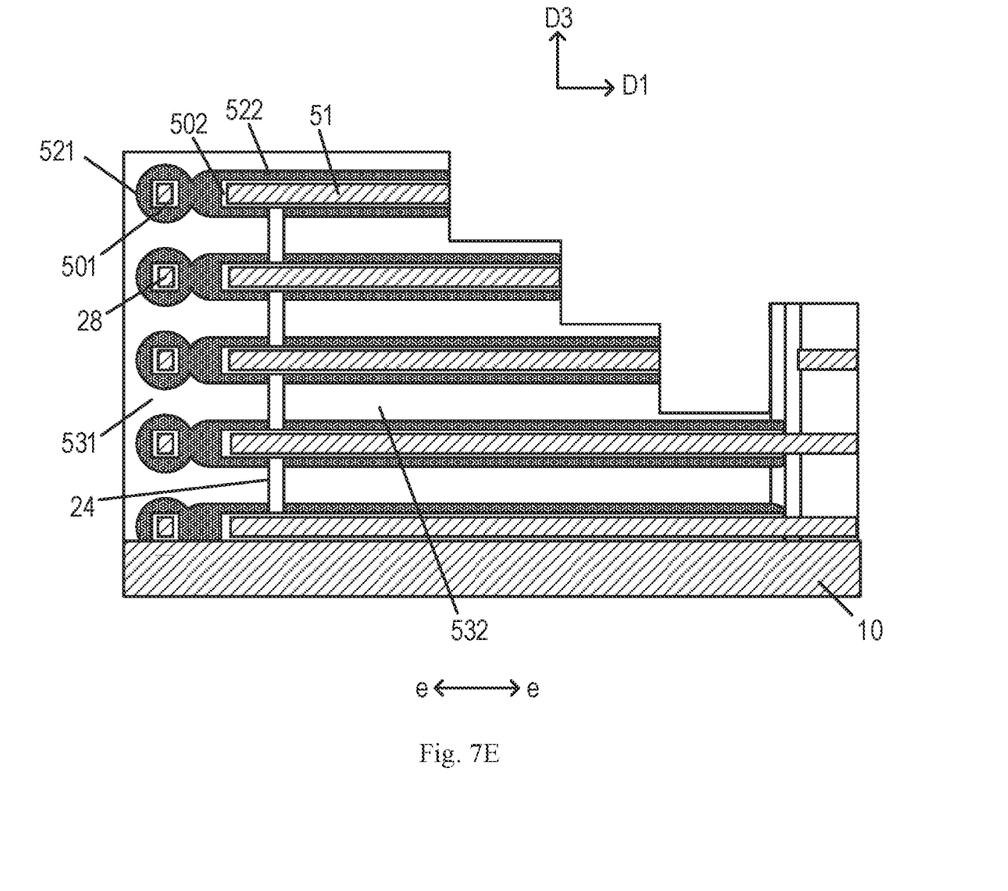

Next, the second stacked layer 73 and the second sub part 522 of the word line are etched to form a step-shaped structure at the end of the second stacked layer 73 away from the first stacked layer 29. The step-shaped structure includes multilayer steps stacked along the third direction D3, and each layer of the steps includes the second semiconductor layer 51, a second dielectric layer 52 wrapping the surface of the second semiconductor layer 51, and the second sub part 522 wrapping the surface of the second dielectric layer 502. In the adjacent two layers of steps along the third direction D3, one of the two layers of steps closer to the substrate 10 protrudes from other one of the two layers of steps along the first direction D1, as shown in FIG. 7E.

Figure 7F:
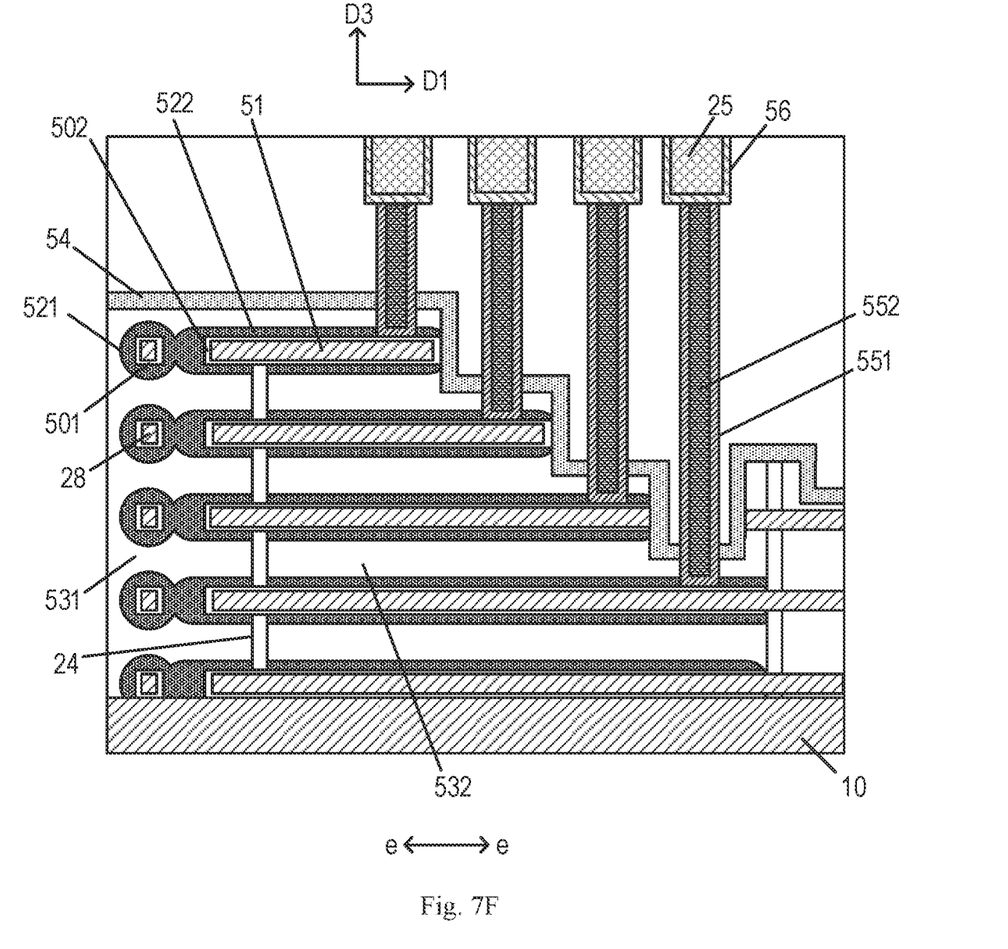

The third spacer 54 wrapping at least the step-shaped structure is formed, and a plug structure electrically connected to the word line structure is formed. The plug structure includes a plurality of word line plugs arranged at intervals along the first direction D1, and the plurality of word line plugs are electrically connected to the end of the second sub part 522 away from the first sub part 521. That is, the plurality of word line plugs are electrically connected to the plurality of step top surfaces of the second sub part 202 having the step-shaped structure. Each of the plurality of word line plugs includes a first conductive pillar 552, and a first plug 25 positioned on the top surface of the first conductive pillar 552. In an embodiment, as shown in FIG. 7F, the word line plug may further include a first diffusion barrier layer 551 wrapping the first conductive pillar 552 and electrically connected to the second sub part 522, and a first conductive layer 56 wrapping the first plug 25 and electrically connected to the first conductive pillar 552 and the first diffusion barrier layer 551, to reduce the electric leakage between adjacent two of the word line plugs and the internal resistance of the word line plug.

According to the three-dimensional semiconductor structure and a formation method thereof provided by some embodiments of the present disclosure, on a substrate there is provided a device structure including memory rows arranged at intervals in the first direction, where each of the memory rows includes memory cells arranged at intervals along the second direction and a gap between adjacent two of the memory cells, and word line structures in the memory cells in one of the memory rows extend into the gap in another one of the memory rows, such that word line signals can be led out from the gap between the two adjacent memory cells. In this way, space on the surface of the substrate can be fully utilized, and an integration level of the three-dimensional semiconductor structure can be improved. In addition, in the present disclosure, an end of the word line structure is formed into a step shape, such that a signal from each word line in the word line structure can be led out conveniently, and thus the integration level of the three-dimensional semiconductor structure can be further improved. Furthermore, two transistors in the memory cells of the present disclosure share one bit line, which contributes to further reducing the size of the three-dimensional semiconductor structure and thus further improving the integration level of the three-dimensional semiconductor structure.

The above merely are embodiments of the present disclosure. It is to be pointed out that to those of ordinary skill in the art, various improvements and embellishments may be made without departing from the principles of the present disclosure, and these improvements and embellishments are also deemed to be within the scope of protection of the present disclosure.

What is claimed is:

1. A three-dimensional semiconductor structure, comprising:
   a substrate; and
   a device structure positioned on a top surface of the substrate;
   wherein the device structure comprises memory rows arranged at intervals along a first direction, each of the memory rows comprises memory cells arranged at intervals along a second direction and a gap between adjacent two of the memory cells, each of the memory cells comprises a first stacked layer and a word line structure, the word line structure comprises a first part positioned in the first stacked layer and a second part extending out of the first stacked layer along the first direction, at least adjacent two of the memory rows exist, the second part of the memory cell in one of the memory rows extends into the gap in another one of the memory rows, both the first direction and the second direction are directions parallel to the top surface of the substrate, and the first direction intersects with the second direction;
   wherein the first stacked layer comprises first semiconductor layers arranged at intervals along a third direction, each of the first semiconductor layers comprises first semiconductor pillars arranged at intervals along the first direction, and the third direction is a direction perpendicular to the top surface of the substrate; and
   the word line structure comprises word lines arranged at intervals along the third direction, the word lines extend along the first direction, each of the word lines comprises a first sub part continuously wrapping the first semiconductor pillars arranged at intervals along the first direction and a second sub part extending out of the first semiconductor layer along the first direction and electrically connected to the first sub part, in any adjacent two of the word lines along the third direction, the second sub part of one of the two word lines closer to the substrate protrudes from the second sub part of other one of the two word lines along the first direction.

2. The three-dimensional semiconductor structure according to claim 1, wherein the first semiconductor layer extends along the second direction; and the device structure further comprises:
   a second stacked layer comprising second semiconductor layers arranged at intervals along the third direction, the second semiconductor layers extend along the first direction, in adjacent two of the second semiconductor layers along the third direction, one of the two second semiconductor layers closer to the substrate protrudes from other one of the two second semiconductor layers along the first direction, and a plurality of the second sub parts respectively wrap a plurality of the second semiconductor layers.

3. The three-dimensional semiconductor structure according to claim 2, wherein a material of the first semiconductor layer and a material of the second semiconductor layer are both silicon materials comprising doped ions.

4. The three-dimensional semiconductor structure according to claim 1, wherein a given one of the memory cells further comprises:
   a plug structure comprising word line plugs arranged at intervals along the first direction, each of the word line plugs extending along the third direction and being electrically connected to the second sub part of the word line.

5. The three-dimensional semiconductor structure according to claim 1, wherein a given one of the memory cells further comprises:
   a bit line structure comprising bit lines arranged at intervals along the first direction, each of the bit lines extending along the third direction; and
   the first semiconductor pillar comprises two semiconductor sub pillars distributed on opposite two sides of the bit line along the second direction and electrically connected to the bit line, and the first sub part of the word line continuously wraps the two semiconductor sub pillars arranged at intervals along the first direction.

6. The three-dimensional semiconductor structure according to claim 5, wherein the either one of the two semiconductor sub pillars comprises a channel region, and a source region and a drain region distributed on opposite two sides of the channel region along the second direction; the bit line is adjacent to and electrically connected to the source region; and the memory cell further comprises:
   a capacitor structure positioned on the substrate, the capacitor structure being adjacent to and electrically connected to the drain region; and
   a support structure positioned on the substrate, the support structure comprising a first sub support structure and a second sub support structure connected to each other, the first sub support structure being positioned in the first stacked layer, and the second sub support structure being distributed around a periphery of the first stacked layer and a periphery of the second part.

7. The three-dimensional semiconductor structure according to claim 1, wherein a length of the second part along the first direction is smaller than a length of the first stacked layer along the first direction.

8. The three-dimensional semiconductor structure according to claim 1, wherein a plurality of the memory rows arranged at intervals along the first direction are sequentially ordered, a plurality of the memory rows at a first odd-numbered position are aligned and arranged along the first direction, and a plurality of the memory rows at a first even-numbered position are aligned and arranged along the first direction.

9. The three-dimensional semiconductor structure according to claim 8, wherein the memory cell further comprises a bit line structure, two of the word line structures are distributed on opposite two sides of the bit line structure along the second direction, and the second parts of the two word line structures are positioned on opposite two sides of the first stacked layer.

10. The three-dimensional semiconductor structure according to claim 9, wherein two of the second parts of the memory cells positioned in a given one of the plurality of memory rows at the first even-numbered position respectively extend into the gaps in two of the plurality of memory rows at the first odd-numbered position adjacent to the given memory row at the first even-numbered position, and two of the second parts of the memory cells positioned in a given one of the plurality of memory rows at the first odd-numbered position respectively extend into the gaps in two of the plurality of memory rows at the first even-numbered position adjacent to the given memory row at the first odd-numbered position.

11. The three-dimensional semiconductor structure according to claim 9, wherein in a plane jointly constituted by the first direction and the third direction, projections of two second parts extending into the same gap are partially overlapped.

12. The three-dimensional semiconductor structure according to claim 8, wherein a given one of the memory cells further comprises a bit line structure, two of the word line structures are distributed on opposite two sides of the bit line structure along the second direction, and the second parts of the two word line structures are positioned on the same side of the first stacked layer.

13. The three-dimensional semiconductor structure according to claim 12, wherein an extension direction of the second part in a given one of the plurality of memory rows at the first odd-numbered position is opposite to an extension direction of the second part in a given one of the plurality of memory rows at the first even-numbered position.

14. A method for forming the three-dimensional semiconductor structure according to claim 1, comprising:
   providing the substrate; and
   forming the device structure on the top surface of the substrate;
   wherein the device structure comprises the memory rows arranged at intervals along the first direction, each of the memory rows comprises the memory cells arranged at intervals along the second direction and the gap between adjacent two of the memory cells, each of the memory cells comprises the first stacked layer and the word line structure, the word line structure comprises the first part positioned in the first stacked layer and the second part extending out of the first stacked layer along the first direction, at least adjacent two of the memory rows exist, the second part of the memory cell in one of the memory rows extends into the gap in another one of the memory rows, both the first direction and the second direction are directions parallel to the top surface of the substrate, and the first direction intersects with the second direction;
   wherein the first stacked layer comprises first semiconductor layers arranged at intervals along a third direction, each of the first semiconductor layers comprises first semiconductor pillars arranged at intervals along the first direction, and the third direction is a direction perpendicular to the top surface of the substrate; and
   the word line structure comprises word lines arranged at intervals along the third direction, the word lines extend along the first direction, each of the word lines comprises a first sub part continuously wrapping the first semiconductor pillars arranged at intervals along the first direction and a second sub part extending out of the first semiconductor layer along the first direction and electrically connected to the first sub part, in any adjacent two of the word lines along the third direction, the second sub part of one of the two word lines closer to the substrate protrudes from the second sub part of other one of the two word lines along the first direction.

* * * * *